United States Patent
Kulkarni et al.

(10) Patent No.: US 6,825,308 B1
(45) Date of Patent: Nov. 30, 2004

(54) COPOLYMERS AND PREPARATION THEREOF

(75) Inventors: Mohan Gopalkrishna Kulkarni, Pune (IN); Jayant Jagannath Khandare, Pune (IN)

(73) Assignee: Council of Scientific and Industrial Research, New Delhi ( * ) Notice: Subject to any disclaimer, the term of this patent is extended or adjusted under 35 U.S.C. 154(b) by 0 days.

(21) Appl. No.: 10/697,663

(22) Filed: Oct. 29, 2003

(51) Int. Cl.$^7$ ............................................. C08F 218/00
(52) U.S. Cl. ................. 526/307.7; 526/217; 526/219.6; 526/234; 526/264; 526/288; 526/291; 526/303.1; 526/304; 526/307.3; 526/317.1; 526/328.5; 526/347.1
(58) Field of Search .............................. 526/217, 219.6, 526/234, 264, 288, 291, 303.1, 304, 307.3, 307.7, 317.1, 328.5, 347.1

(56) References Cited

U.S. PATENT DOCUMENTS 4,283,384 A * 8/1981 Jacquet et al. ................. 424/47
5,891,862 A * 4/1999 Mandeville et al. ........... 514/54

FOREIGN PATENT DOCUMENTS

| DE | 102 04 234 A1 | * | 8/2003 |
| JP | 2003-026725 | * | 1/2003 |
| WO | WO 99/08717 | * | 2/1999 |
| WO | WO 99/64563 | * | 12/1999 |

OTHER PUBLICATIONS

Kim et al. Korea Polymer Journal (1996), 4(1), 16–22.*
Kim et al. Enzyme and Microbial Technology (1999), 25, 31–37.*

* cited by examiner

*Primary Examiner*—Helen L. Pezzuto
(74) *Attorney, Agent, or Firm*—Merchant & Gould P.C.

(57) ABSTRACT

The present invention relates to copolymers for applications in medicine and biotechnology and preparation thereof. Copolymers comprises polyvalent N-Acetyl Glucosamine (NAG) in polyvalent form and bind more efficiently to lysozyme than NAG itself. The copolymers exhibit effective inhibition even at very low ligand concentrations. The copolymers could be used for prevention and treatment of bacterial and viral infections. Moreover, these copolymers form are stimuli sensitive polymers and can be used for the recovery of biomolecules. The methodology can be extended to other ligands such as sialic acid and used for preventing influenza and/or rotavirus infections. It also provides a method for the synthesis of copolymers wherein polymers comprising sequences of specific ligands are required.

35 Claims, No Drawings

COPOLYMERS AND PREPARATION THEREOF

FIELD OF INVENTION

This invention relates to copolymers containing N-Acetyl Glucosamine (NAG) of formula (1) having molecular weight ranging from 1,000 Daltons to 2,00,000 Daltons herein below

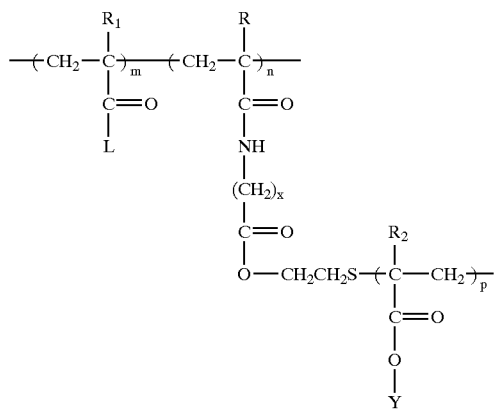

Formula (1)

wherein,

R is H, $CH_3$, $C_2H_5$, $C_6H_5$; $R_1$ is H, $CH_3$, $C_2H_5$, $C_6H_5$; $R_2$ is H, $CH_3$, $C_2H_5$, $C_6H_5$;

X varies between 4–10; m is from 3 to 500; n is from 2 to 50; p is from 2 to 50; L is OH, $NH_2$, $OCH_3$, $NHCH(CH_3)_2$; and Y may be N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose.

More particularly it relates to the said copolymers containing carbohydrate ligands and preparation thereof mentioned herein. Still more particularly it relates to copolymers which bind more strongly to lysozyme than NAG itself.

The copolymers of the present invention as mentioned above are prepared by reacting monomer of formula (2) herein below with polymerizable macromer of formula (3) claimed in another copending.

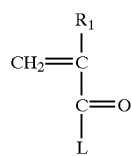

Formula (2)

wherein, $R_1$ is H, $CH_3$, $C_2H_5$, $C_6H_5$, L is OH, $NH_2$, $OCH_3$ and $NHCH(CH_3)_2$

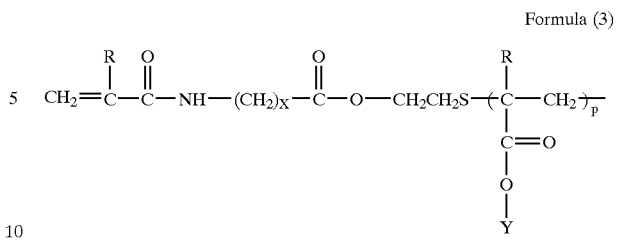

Formula (3)

wherein,

R is H, $CH_3$, $C_2H_5$, $C_6H_5$, $R_2$ is H, $CH_3$, $C_2H_5$, $C6H_5$.

X may be between 4–10, p is from 2 to 50.

Y may be N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose.

The copolymers may be used for inhibition of viral infections and the recoveries of biomolecules. The approach of synthesis of copolymers with ligand N-Acetyl Glucosamine (NAG) is a generic and can be used for other ligands such as sialic acid, galactose and mannose.

BACKGROUND OF THE INVENTION

Carbohydrates exhibit molecular diversity and wide structural variations, which makes carbohydrates alternative ligands for competitive binding to inhibit the infections. Sharon et al., (Science, 246:227–234,1989) reported carbohydrate portions of glyco-conjugate molecules to be an important entity in biology. One of the major advantage of carbohydrate modification may be that it can impart change in physical characteristics such as solubility, stability, activity, antibody recognition and susceptibility to enzyme.

Carbohydrates can be incorporated in polymer chain and can be utilized for binding to the receptors. Thereby, the polymers can be coupled with the other polymers containing ligands to impart multivalent effect.

Carbohydrates play a crucial role in biological phenomena and therefore such molecules have attracted the attention of chemists and biochemists. These biomolecules are ubiquitous, figuring prominently in various processes such as cell differentiation, cell growth, inflammation, viral and bacterial infection, tumorigenesis and metastasis (Rouhi A.,M., C & EN, September 23,62–66,1996).

Infections caused by bacteria and virus are a result of host receptor interactions. The foremost step for the infection is the adhesion of the ligands present on the infectious microbe to the receptors of the host cells. Adhesion and interactions have to be strong for a successful infection. If the adhesion is not adequate then normal defense mechanism can intercept this process. Viruses and bacteria for example interact with certain saccharides of the host cell. Bacteria express a large number of lectins and are used to adhere to glycocalyx of the host cell through a multivalent interactions. Agglutination of erythrocytes is a case in point.

Many alterations and modifications of the naturally occurring O/N-glycosidic sugars are being reported and is an area of prime interest to the chemist and biochemist. Carbohydrates are usually linked to other moieties such as lipids or proteins. Belvilacqua et al., (Science, 243:1160,1989) have demonstrated the role of carbohydrates along with proteins and nucleic acids as a primary biological information carriers.

Recently few reports have been published to justify the use of carbohydrates in therapeutics for human, as they can play crucial role in prevention of viral and bacterial infections. Krepinsky et al. (U.S. Pat. No. 6,184,368, 2001) suggested the application of carbohydrates in preventing the infections. Mandeville, et al. (U.S Pat. No. 5,891,862,1999) reported the use of polyvalent polymers containing carbohydrates for the treatment of rotavirus infection.

Polyvalent molecules bind to the receptor molecules through multiple contacts, which results in strong binding. However, the synthesis of ligands is critical and involves multiple steps. The polyvalent interactions can be maximized by incorporation of ligands optimally tailored based on the understanding of the binding between the ligand and the host receptor. The enhanced interactions are important especially when the ligands are expensive e.g. sialic acid.

The inventors of the present invention have also observed that interactions can be enhanced by 1) appropriate incorporation of the ligand 2) incorporation of spacer chain and 3) steric stabilization/exclusion using polymers.

Spaltenstein et al., (J.Am.Chem. Soc.,113:686,1991) reported increased interaction between the receptor and ligand due to plurality of binding ligands and the receptors on the host surface. This was illustrated by the influenza virus hemagglutinin, which binds to neuraminic acid on the cell surface, which has a greater affinity for its receptor when a polyvalent structure is presented.

Protein carbohydrate interactions are of low affinity. If relative density and spatial arrangement of ligands incorporated is optimized, then the binding can be substantially enhanced. The enhanced interaction between molecular conjugate with a specific binding site of biomolecule also finds applications in affinity separations, drug delivery and biotechnology.

Design of high affinity protein carbohydrate binding systems can provide an alternative strategy for the treatment of infectious diseases e.g. influenza and rotavirus. This has the advantage as such agents will not have pathogen resistance to antibiotics and drugs. A new approach to treat influenza is based on the principle of inhibition of virus to the host cells. The inhibitors like sialic acid anchored to polymeric or liposomal carriers have been reported in the past.

Since monovalent interactions of natural oligosaccharides are weak, they need to be used in large quantities for an effective treatment. This problem can be overcome by synthesizing polyvalent carbohydrate molecules (Zopf, D., Roth, S. Lancet 347, 1017, 1996). The concept is attractive since it would provide a non-toxic therapeutic to a wide range of human diseases. But synthesis of such compounds is critical and requires knowledge of the host-cell binding mechanism.

Polymeric ligands that bind to the virus more powerfully than the Red Blood Cells will prevent the influenza infection. Similar binding is also involved in rotavirus infections. (Mandeville, et al. U.S. Pat. No. 6,187,762, 2001)

Advantage of carbohydrate modification lies in that it may impart change in physical characteristics such as solubility, stability, activity, antibody recognition and susceptibility to enzyme.

Sigal, et al., demonstrated (J. Am. Chem. Soc. 118:16, 3789–3800,1996) haemagglutination prevention by saccharides multivalent glycoconjugates, which bind to the bacterial lectins and thus inhibit bacterial adhesion. Damschroder et al. (U.S. Pat. No. 2,548,520,1951) demonstrated high molecular weight preformed polymers conjugated with unsaturated monomers or proteins. Synthesis of high molecular weight materials of this kind generally requires temperatures up to 100° C. Such high temperatures are not well tolerated by most of the proteins as they are thermolabile. Thus the methods described are unsuitable for producing polymers of biologically active molecules.

Carbohydrates can be used as functionalized ligands by incorporation into polymer backbone. The copolymers containing NAG and macromer containing polyvalent NAG form a multivalent conjugate.

Multivalent copolymers of varied length and density will be useful for receptor ligand interactions of biological origin. Various chemical and chemoenzymetic methods have been reported in the past for the preparation of di- and trivalent ligands, dendrimers, and high molecular weight polymers but have proven to be complicated to synthesize. Thus, there is necessity of a simple methodology to obtain multivalent ligands and polymers of varying chain length. Mammen,M., and Whitesides,G.,M., demonstrated that (J.Med.Chem.38:21,4179–90,1995) agglutination of erythrocytes caused by influenza virus could be prevented by use of polyvalent sialic acid inhibitor. Moreover, they suggested two favorable mechanisms for inhibition between the surfaces of virus and erythrocytes 1) high-affinity binding through polyvalency and 2) steric stabilization. This novel approach is a model for pathogen-host interactions.

Sigel, et al.(J.Am.Chem.Soc.118:16,3789–3800,1996) prepared polymers containing sialoside and evaluated the efficiency of inhibition of influenza virus in terms of inhibition constants ($K_i$).Although the authors observed that the extent of inhibition and minimum inhibition concentration decreased with increase in polymer molecular weight and sialic acid content, it was also noted that not all sialic acid ligands were involved in binding with the virus. This clearly indicates need of tailoring the polymer structure so that higher fraction of ligands is involved in binding.

Spevak et al. (J. Am. Chem. Soc., 115,1146–1147, 1993) reported the polymerized liposomes containing C-glycosides of sialic acid, which were potent inhibitors of influenza virus. Moreover the authors demonstrated that the infection was inhibited more effectively when the ligand bearing monomer was polymerized.

Various methods have been reported in the past to synthesize multivalent ligands such as ring-opening metathesis polymerization (ROMP). ROMP has been used to generate defined, biologically active polymers by Gibson et al., (Chem. Comm., 1095–1096,1997) and Biagini et al., (Polymer, 39, 1007–1014,1998).

Recent advancements in the field of glycoscience have demonstrated enhanced binding between carbohydrate ligands and specific receptors as a result of the cluster effect. These interactions are result from intrinsic properties of such ligands.

Various methods have been reported in the past for the synthesis of glycoconjugate oligomers and the clusters for the receptor binding activity. Nishimora, et al. (Macromolecules, 27, 4876–4880,1994) synthesized sugar homopolymer clusters from acrylamidoalkyl glycosides of N-Acetyl-D-Glucosamine. On addition of the polymer clusters, binding to WGA was enhanced.

Various methods for the preparation of random, block or graft copolymers containing N-isopropyl acrylamide monomer are reported in the past. e.g. a number of monomers including butyl methacrylate, N-isopropyl methacrylamide and dextran sulfate have been polymerized with N-isopropyl acrylamide to prepare random copolymers. Hoffman et al. (J. Biomater. Sci., Polym. Ed., 4(5), 545 (1993) synthesized carboxyl terminated poly(N-isopropyl acrylamide) oligomers, which were reacted with biopolymers to form thermo-reversible polymer-enzyme conjugates.

Therefore, the objective of the present work is to synthesize copolymers containing polyvalent ligand for enhanced interactions with the substrates.

Chitosan is linear, binary heteropolysaccharide and consists of 2-aceta amido-2-deoxy-β-D-glucose (GlcNAc; A-unit) and 2-amino 2-deoxy-β-B-glucose (GIcNAc. D-unit). The active site of lysozyme comprises subsites designated A-F. Specific binding of chitosan sequences to lysozyme begins with binding of the NAG units in the subsite C. Moreover, there is a need to synthesize ligands similar to repeat units of chitosan which will not be hydrolyzed by lysozyme. Moreover natural ligands derived from glucose are susceptible to microbial growth. The copolymers reported here are stable than chitin and chitosan reported earlier.

In our another study entitled "Oligomers and Preparation Thereof"(Copending application No.), the applicants have shown that the oligomers of NAG in which the NAG groups are juxtaposed to one another, bind more effectively to lysozylne as reflected in values of binding constant ($K_b$) and the inhibition concentrations $I_{50}$. In the conventional technique of free radical copolymerization the distribution of monomers along the polymer chain depends upon the values of the monomer reactivity ratios which are determined primarily by the intrinsic structure of the monomer. Consequently the distribution of the NAG units in the copolymers comprising monomers bearing NAG cannot be tailored at will using conventional copolymerization techniques.

To overcome this problem the applicants have devised a novel strategy to ensure that the copolymers prepared using conventional free radical polymerization technique will always contain sequences of NAG units in juxtaposition.

The applicants have further demonstrated that copolymers containing various carbohydrates including NAG units as macromers, bind to lysozyme more strongly as evidenced by values of $K_b$ and inhibit lysozyme more efficiently as evidenced by values of $I_{50}$. Thus the present invention provides copolymers various carbohydrates including NAG for a biomolecular target and method for preparation thereof.

The approach described to prepare copolymers of various carbohydrates including NAG is simple and can be used to synthesize other macromeric ligands such as sialic acid which bind to influenza virus and rotavirus. Such copolymers may be even used as antiinfective agents both for prevention and treatment of diseases. Moreover, resultant copolymers reported are thernoprecipitating polymers which maybe used for the recovery of biomolecules such as lysozyme and lectins.

The copolymers various carbohydrates including NAG conjugated to polyvalent ligands may also further be used in the treatment of bacterial or viral infections, and are expected not to cause drug resistance.

The approach described herein is a generic one and can be extended to other systems as well for example sialic acid.

SUMMARY OF THE INVENTION

The present invention provides methods for the preparation of copolymers containing various carbohydrates including polyvalent N-Acetyl Glucosamine (NAG). The copolymers in this invention are prepared by free radical polymerization method, which is convenient and simple. In the process of copolymerization reported here result in juxtaposition arrangement of polyvalent ligand sequences. Thus, the copolymers provide improved binding and inhibition in term of binding constant ($K_b$) and inhibition concentration ($I_{50}$) respect. Copolymers reported here can be used for prevention of viral infections and recoveries of biomolecules.

DETAILED DESCRIPTION OF THE INVENTION

The present invention relates to the copolymers containing various carbohydrates including NAG for applications in medicine and biotechnology. Another aspect of the present invention is to use copolymers for enhanced interactions with biomolecules.

It is possible to prepare either water-soluble or water-insoluble polymers by changing the chemical composition of the monomers, which may impart various chemical and physical properties. e.g. water-soluble monomers such as N-isopropyl acrylamide (NIPA) may be homopolymerized to form water-soluble homopolymers.

Many polymers such as polysaccharides and polyacrylics which are water insoluble are being used in the biochemistry, affinity chromatography and immunoassays as solid-phase supports with passively adsorbed or covalently linked antibodies.

A further aspect of the present invention is to prepare copolymers comprising a polyvalent carbohydrate ligands.

The term "copolymer" means any polymer prepared by using acrylic or methacrylic acid, acryloyl or methacryloyl chloride, glycidyl acrylate or methacrylate, glycerol acrylate or methacrylate, allyl chloride; hydroxy-lower-alkyl-acrylates, such as 2-hydroxyethyl methacrylate or 3-hydroxypropyl methacrylate, and amino-lower-alkylacrylates, such as 2-amino-ethyl methacrylate with polymerizable polyvalent ligands containing NAG, sialic acid or mannose. Monomers, which are soluble in water or water/polar organic solvent mixtures, are particularly preferred.

A "polyvalent ligand" means any polymer containing ligands N-Acetyl Glucosamine, mannose, galactose and sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose. Polyvalent ligands are soluble in water or water/polar organic solvent mixtures are preferred.

NAG is derived from chitosan which is a linear, binary heteropolysaccharide and consists 2-acetaamido-2-deoxy-β-D-glucose (GIcNAc; A-unit) and 2-amino 2-deoxy-β-D-glucose (GIcNAc, D-unit).Chitosan is a powerful natural ligand, which binds to lysozyme through the NAG residues. But it suffers from three major limitations) Chitosan is insoluble at neutral pH, which limits many applications. 2) Chitosan undergoes the transglycosylation and mutarotation, which substantially reduces its activity and efficiency 3) Chitosan is hydrolyzed by lysozyme.

Accordingly the object of present invention is to provide a simple and novel process for the preparation of copolymers comprising carbohydrates including polyvalent NAG, which exhibit multivalent interactions. The merits of the approach have been highlighted using NAG as an illustration.

Accordingly the present invention provides copolymers having formula (1) and the molecular weight ranging from 1,000 Daltons to 2,00,000 Dallons, as herein below shown:

Formula (1)

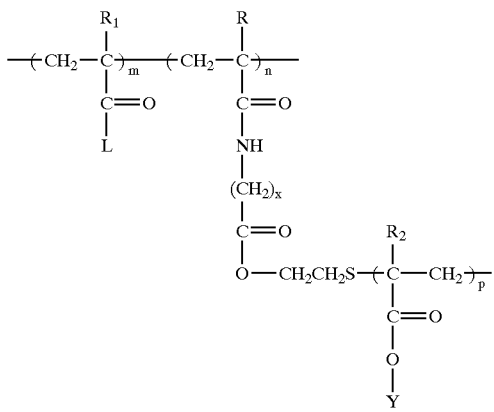

wherein,
R is H, CH$_3$, C$_2$H$_5$, C$_6$H$_5$; R$_1$ is H, CH$_3$; C$_2$H$_5$, C$_6$H$_5$; R$_2$ is H, CH$_3$, C$_2$H$_5$, C$_6$H$_5$;
X may be between 4–10; m is from 3 to 500; n is from 2 to 50; p is from 2 to 50; L is OH, NH$_2$,OCH$_3$, NHCH(CH$_3$)$_2$; and
Y may be N-Acetyl Glucosamine (NAG), mannose, galactose, sialic acid, fructose, ribulose, erythrolose, xylulose, psicose, sorbose, tagatose, glucopyranose, fructofiranose, deoxyribose; galactosamine, sucrose, lactose, isomaltose, maltose, cellobiose, cellulose and amylose.

One more embodiment of the present invention relates to copolymers for applications in medicine and biotechnology.

One more embodiment of the present invention relates to copolymers that are more stable for interaction with biomolecules.

Another embodiment of the present invention relates to wherein, the copolymers containing NAG in the macromer polyvalent form are more efficient than NAG alone in enzyme inhibition as evidenced by higher values of K$_b$ and lower values of I$_{50}$.

Another embodiment of the present invention relates to wherein, the binding constant (K$_b$) for the copolymers of NIPA and Ac.NAG is in the range of 1.97×10$^5$ to 2.47×10$^5$.

In another embodiment of the present invention relates to wherein, the copolymers along with NAG enhance the Kb by 2556 folds than the NAG alone.

Still another embodiment of the present invention relates to wherein, the copolymers reduce the lysozyme inhibition (I$_{50}$) by about 28500 folds.

Another embodiment of the present invention relates to the binding (I$_{max}$) of copolymers is enhance in the range of about 69 to 95.

Yet another embodiment of the present invention relates to the copolymers containing the ligands are synthesized by free radical polymerization.

Still another embodiment of the present invention relates to the copolymers provides greater accessibility to the ligand conjugate for binding with receptor biomolecule.

In one more embodiment of the present invention relates to the presence of multiple ligands in the polymer backbone will enhance binding to the multiple sites/receptors of virus and biomolecules such as influenza virus, rotavirus, wheat germ agglutinin, thereby enhancing the inhibitory effect. The copolymers containing multiple ligands can potentially interact with multiple sites/receptors simultaneously thereby enhancing the binding to lysozyme.

Another embodiment of the present invention relates to the copolymers containing ligands reported herein are effective at very low concentration, which is advantage when the ligand under consideration are expensive.

In one more embodiment of the present invention relates to the copolymers for the interactions with biomolecules than the natural polymers such as chitin and chitosan containing natural ligand NAG.

In still another embodiment of the present invention provides a simple and novel process for the preparation of copolymers of formula 1, said process comprising of (i) dissolving the ploymerizable macromer in a solvent followed by stirring to obtain a clear reaction mixture, (ii) purging nitrogen in the reaction mixture in range of about 10 minutes to about 45 minutes, preferably about 30 minutes, (iii) adding the reaction mixture of step (b) to an initiator containing an accelerator, (iv) allowing the reaction mixture of step (c) to copolymerize for about 2 to 13 hrs at a temperature in the range of about 25° C. to 65° C., (v) precipitating the copolymer of step (d) by adding a solvent, and (vi) drying the precipitated copolymer of step (e) by vacuum at room temperature to obtain the copolymer.

In still another embodiment of the present invention the polymerizable monomers are selected from a group comprising of acrylic acid, methacrylic acid, methacryloyl chloride, acrylamide, N-isopropyl acrylamide (NIPA), 2-acrlamido-2-methylpropane sulphonic acid (AMPS) methacrylate, acryloyl chloride, acryloyl morpholine, vinylpyrrolidone and styrene.

Yet another embodiment of the present invention relates to wherein the initiator is selected from the group comprising of Ammonium Per Sulphate (APS); Potassium Per Sulphate (KPS), or Azobis Iso Butyro Nitril (AIBN).

In still another embodiment of the present invention relates wherein the initiator used is in the range of about 0.1 to 5%, about preferably 1%.

In still another embodiment of the present invention relates to accelerator wherein said accelerator is selected is N,N,N',N" Tetramethyl Ethylene Diamine (TEMED).

In one more embodiment of the present invention relates to the accelerator wherein the said accelerator is used in the range of about 0.1 to 5%, preferably about 1%.

Yet another embodiment of the present invention relates to the coploymerization temperature wherein the copolymerization is carried out in the temperature range of about 30 to 60° C.

Still another embodiment of the present invention relates to the solvents wherein the solvents are selected from group comprising of diethyl ether, acetone, hexane or hot water.

In another embodiment of the present invention the ratio of polymerizable monomer to polymeric macromer is in the range of 2:98 to 98:2.

Still another embodiment of the present invention provides a convenient method of preparation of copolymers in the form of monomers containing Acryloyl, Methacryloyl or Para Vinyl Benzoyl (PVB) moieties.

In one of the embodiment of the present the polymerizable macromer has general formula (4) as given below which has been claimed in our application entitled "Polymerizable macromer and preparation thereof" (Copending Applcation No . . . )

Formula (4)

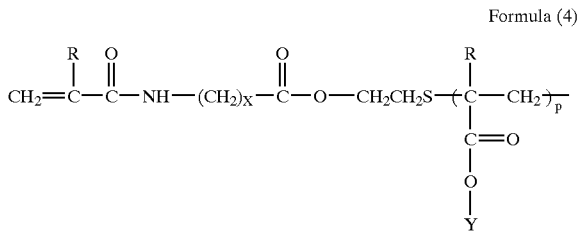

wherein,
R is H, CH$_3$, C$_2$H$_5$, C$_6$H$_5$; p is from 2 to 50; X may be between 4 to 10; n is from 3 to 50; and
Y may be N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose.

The ability of copolymers to bind virus and biomolecules provides a means of developing new therapeutical agents. These copolymers can be used in various applications such as affinity separations and immunoassays.

The process for the preparation of the copolymers containing NAG is illustrated herein below with reference to examples, which are illustrative only and should not be considered to limit the scope of the present invention in any manner.

The process for the preparation of copolymers described herein below with reference to examples, which are illustrative only and should not be construed to limit the scope of the present invention in any manner whatsoever.

EXAMPLES

Example 1

This example describes the process for the preparation of Macromer: Acryloyl 6-Amino Caproyl poly. Acryloyl N-Acetyl Glucosamine (Ac. 6 ACA.P.Ac.NAG).

Ac.6 Amino Caproic Acid (0.122 gm.) and P. Ac. N-Acetyl Glucosamine (2 gm,)were taken in a 100 ml flask, DMF (25 ml) was added and stirred continuously to obtain a clear mixture. Di Cyclohexyl Carbodiimide (0.136 gm) was first dissolved in DMF (5 ml) and added dropwise to the mixture. It was stirred continuously for 24 hrs. at room temperature. Di Cyclohexyl Urea (DCU) was filtered off and the macromer was precipitated in acetone, and vacuum dried.

Example 2

This example describes the process for the preparation of copolymers of N-isoprpopyl acrylamide (NIPA) and Acryloyl 6-Amino Caproic Acid Poly.Acryloyl N-Acetyl Glucosamine (Macromer).

4 gm of N-isoprpopyl acrylamide (NIPA) and 0.5 gm of Acryloyl 6-Amino Caproic Acid Poly.Acryloyl N-Acetyl Glucosamine (Macromer) was placed in a reactor and dissolved in 25 ml distilled water and stirred continuously. The resulting mixture was nitrogen purged and 1% ammonium per sulphate was added as initiator. 1% TEMED was used as accelerator. The copolymerization was carried 30° C. for 4 hrs. Polymer was precipitated in diethyl ethyl and reprecipitated to remove unreacted monomer. Vacuum dried the polymer at room temperature.

Example 3

This example describes the process for the preparation of copolymers of N-isopropyl acrylamide and Acryloyl N-Acetyl Glucosamine.

4 gm of N-isopropyl acrylamide and 1 gm of Acryloyl N-Acetyl Glucosamine in was dissolved in 25 ml of water jacketed reactor. Polymerization was carried out at 30° C. under nitrogen purging by addition of 1% (w/w) of ammonium per sulfate as a initiator and 1% v/w of TEMED (accelerator) for 4 hours. The polymer obtained was precipitated in diethyl ether. The polymer was reprecipitated with diethyl ether and dried under vacuum at room temperature.

Example 4

This example describes estimation of binding constant ($K_b$) for copolymers containing NAG incorporated as monomer and macromer by fluorescence spectrophotometric method and the enhancement resulting from conjugation with monomers and monomer containing spacer.

Fluorescence spectra of lysozyme were recorded on a Perkin Elmer LS-50 B luminescence spectrophotometer. Excitation frequency was 285 nm. Solutions of lysozyme and N-Acetyl Glucosamine were prepared in 0.066 M phosphate buffer pH 6.2, containing 0.0154 M sodium chloride and 0.008 M sodium azide. 0.1 milliliter of lysozyme 80 µg/ml was mixed with solution containing different ligand concentration in a 2 ml capacity 10 mm square quartz cells maintained at 18° C. Phosphate buffer was added to make the volume to 2 ml. The fluorescence intensities of the solutions were measured, relative to the solutions containing enzymes and buffer mixtures of the identical concentrations reference. The relative fluorescence intensity of lysozyme saturated with solution containing different ligand concentration, F∝, was extrapolated from the experimental values by plotting 1/(F$_o$–F) against 1/[S] where F is the measured fluorescence of a solution containing enzyme with given substrate concentration [S] and F$_o$ is the fluorescence of the solution of enzyme alone (Chipman et al., J. Biol. Chem., 242–19, 4388–4394,1967). The highest concentration of polymer substrates was used when enzyme was saturated more than 85%.

TABLE 1

Binding Constants ($K_b$) for Copolymers of NIPA and Ac.NAG

| Mole % NAG NMR | Mol. Wt. VPO | $K_b$ |
|---|---|---|
| 14 | 3200 | 2.03 × 10$^5$ |
| 18 | 1954 | 1.97 × 10$^5$ |
| 34 | 5953 | 2.47 × 10$^5$ |
| 42 | 2560 | 2.05 × 10$^5$ |

The binding constant for Copolymers of NIPA and Ac.NAG are summarized in Table 1. wherein, polymers containing 42 mole % NAG has binding constant 2.05×10$^5$, which shows 2556 folds enhancement to NAG (5.24×10$^2$).

TABLE 2

Binding Constants ($K_b$) for Copolymers of
NIPA & Macromer (Ac.6-ACA.PAc.NAG)

| % Moles NAG NMR | Mol. Wt NIPA | Mol Wt. Macromer | $K_b$ |
|---|---|---|---|
| 40 | 113.16 | 823 | $5.08 \times 10^5$ |
| 36 | 113.16 | 823 | $5.01 \times 10^5$ |
| 33 | 113.16 | 823 | $3.80 \times 10^5$ |
| 17 | 113.16 | 823 | $2.45 \times 10^5$ |

The binding constant for Copolymers of NIPA and Macromer are summarized in Table 2 wherein, polymers containing 17% moles NAG has binding constant $2.45 \times 10^5$ which shows 2138 folds enhancement to NAG ($5.24 \times 10^2$)

Example 5

This example describes the estimation of inhibition of lysozyme by copolymers.

*Micrococcus lysodeikticus* is a substrate for the enzyme lysozyme. Relative binding of copolymers was estimated by using a procedure reported by Neuberger and Wilson (1967).

1.5% w/v stock solutions of copolymer was prepared in 0.0066 M phosphate buffer pH 6.2 containing 0.0154 m sodium chloride and 0.008 M sodium azide. One milliliter of stock solution containing different copolymer concentration was mixed with 1.6 ml of 78 µg/ml of *Micrococcus lysodeikticus* in a 3-ml capacity glass cuvette. The mixture was incubated for 5 minutes at 20° C. To this mixture 0.1 ml of lysozyme (27 µg/ml) was added and mixed thoroughly. The relative absorbance at 450 nm ($\Delta_{450}$) was recorded for 30 seconds. A blank reading without the copolymer was noted and the change in the absorbance per second was calculated. Then relative inhibition was calculated.

TABLE 3

Estimation of Relative Inhibition of Lysozyme
by Monomers, Oligomers and Macromer Containing NAG

| | Mol. Wt. | $I_{50}$ mM | $I_{max}$ | $I_{max}$ mM |
|---|---|---|---|---|
| NAG | 221 | 74.00 | 55.29 | 92.5 |
| PAc.NAG | 638 | 0.0026 | 89.30 | 0.00433 |
| PAc.NAG | 1315 | 0.00168 | 73.43 | 0.00422 |
| PAc.NAG | 2631 | 0.00147 | 73.00 | 0.00211 |
| PAc.NAG | 2808 | 0.0029 | 69.08 | 0.0037 |
| Ac.6ACA.PAc.NAG | 823 | 0.00268 | 94.10 | 0.0036 |

The relative inhibition of lysozyme in terms of 150 has decreased to 0.0026 for oligomer of molecular weight 638 and is almost 28000 folds lower to NAG. The inhibition for macromer is 0.00268 mM, which shows more than 27,000 folds decrease to NAG (74 mM). The $I_{max}$ increased from 55.29 to 94.1.(Table 3).

TABLE 4

Estimation of Relative Inhibition of
Lysozyme by Copolymers of NIPA and Ac.NAG

| Mole % NAG NMR | Mol. Wt. VPO | $I_{50}$ mM | $I_{max}$ | $I_{max}$ mM |
|---|---|---|---|---|
| 14 | 3200 | 0.0021 | 64.95 | 0.0028 |
| 18 | 1954 | 0.0034 | 52.13 | 0.0036 |

TABLE 4-continued

Estimation of Relative Inhibition of
Lysozyme by Copolymers of NIPA and Ac.NAG

| Mole % NAG NMR | Mol. Wt. VPO | $I_{50}$ mM | $I_{max}$ | $I_{max}$ mM |
|---|---|---|---|---|
| 34 | 5953 | 0.0056 | 58.00 | 0.0065 |
| 42 | 2560 | 0.0057 | 72.50 | 0.0084 |
| 54 | 2318 | 0.0079 | 68.33 | 0.0109 |

The relative inhibition of lysozyme in terms of $I_{50}$ for copolymers of NIPA and Ac.NAG NAG has decreased to 0.0057 mM for 42 mole % NAG. $I_{50}$ decreased almost 13700 folds lower to NAG. The $I_{max}$ increased from 55.29 to 72.50. (Table 4).

TABLE 5

Estimation of Relative Inhibition of
Lysozyme by Copolymers of NIPA &
Ac.6-ACA.PAc.NAG (Macromer)

| % Moles NAG NMR | Mol. Wt NIPA | Mol Wt. Macromer | $I_{50}$ mM | $I_{max}$ | $I_{max}$ mM |
|---|---|---|---|---|---|
| 40 | 113.16 | 823 | 0.000120 | 89.65 | 0.00011 |
| 36 | 113.16 | 823 | 0.000117 | 88.12 | 0.00080 |
| 33 | 113.16 | 823 | 0.000133 | 90.00 | 0.00033 |
| 17 | 113.16 | 823 | 0.000343 | 81.00 | 0.00034 |

The relative inhibition of lysozyme in terms of $I_{50}$ for copolymers of NIPA and Macromer has decreased to 0.000120 mM for 40% mole NAG. $I_{50}$ decreased almost 6,166,66 folds lower to NAG. The $I_{max}$ increased from 55.29 to 89.65 (Table 5).

The advantages of the present invention are as follows:

1. The copolymers reported here comprise polyvalent ligands for enhanced interactions.
2. The copolymers have higher molecular weight and demonstrate greater efficiency through steric exclusion.
3. The copolymers have greater water solubility, stability, and susceptibility to enzyme from hydrolysis.
4. The enhancement in binding due to polyvalent interactions arise from the conformational flexibility of copolymers with the biological receptors.
5. The method of preparation of copolymers always give juxtaposition polyvalent sequences of ligands and is convenient and simple.
6. The copolymers containing polyvalent NAG are effective even at low ligand concentration than monomer itself.
7. The copolymers are thermoprecipitating polymers and make them suitable for biomolecule recovery.
8. The copolymers can bind simultaneously to multiple binding sites of biomolecules thereby demonstrates enhanced interactions.
9. The methodology of preparation of copolymers reported here can be extended to other polymers and ligands such as sialic acid and used for preventing influenza and/or rotavirus infections.

What is claimed is:

1. Copolymers having formula (1)

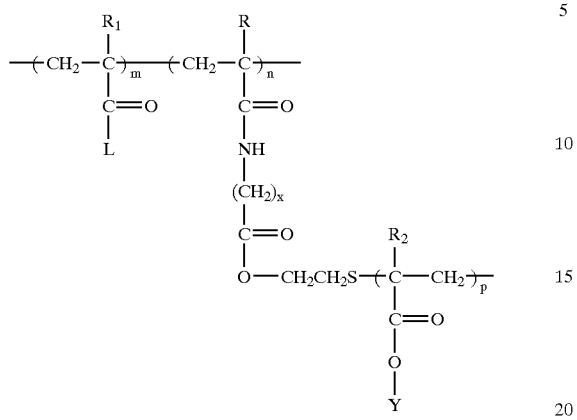

Formula (1)

wherein,

R is H, $CH_3$, $C_2H_5$, $C_6H_5$; $R_1$ is H, $CH_3$, $C_2H_5$, $C_6H_5$; $R_2$ is H, $CH_3$, $C_2H_5$, $C_6H_5$;

X is between 4–10; m is from 3 to 500; n is from 2 to 50; p is form 2 to 50; L is OH, $NH_2$, $OCH_3$, $NHCH(CH_3)_2$; and Y is N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose.

2. A copolymer as claimed in claim 1, wherein the molecular weight of the copolymers is in the range of 1,000 to 2,00,000 daltons.

3. A copolymer as claimed in claim 1, wherein the ratio of polymerizable monomer to polymeric macromer is in the range of 2:98 to 98:2.

4. A copolymer as claimed in claim 1, wherein the copolymers containing the ligand are useful for applications in medicine and biotechnology.

5. A copolymer as claimed in claim 1, wherein the copolymers are more stable for interactions with biomolecules.

6. A copolymer as claimed in claim 1, wherein the macropolymer polyvalent form are more efficient than NAG alone in enzyme inhibition.

7. A copolymer as claimed in claim 1, wherein the binding constant ($K_b$) for copolymers of NIPA and Ac. NAG is in the range of $1.97 \times 10^5$ to $2.47 \times 10^5$.

8. A copolymer as claimed in claim 6, wherein the copolymers along with NAG enhance the $K_b$ by 2556 folds than the NAG alone.

9. A copolymer as claimed in claim 1, wherein the copolymers reduce the lysozyme inhibition ($I_{50}$) by about 28500 folds.

10. A copolymer as claimed in claim 1, wherein the binding ($I_{max}$) of copolymers is enhance in the range of about 69 to 95.

11. A copolymer as claimed in claim 1, wherein the copolymers containing the ligands are synthesized by free radical polymerization.

12. A copolymer as claimed in claim 1, wherein the copolymers provide a greater accessibility to the ligand conjugate for binding with receptor bio-molecule.

13. A copolymer as claimed in claim 1, wherein the copolymers containing ligands bind simultaneously on the multiple sites of the enzymes/disease causing viruses thereby enhancing the inhibitory effect.

14. A copolymer as claimed in claim 1, wherein the copolymers ligands are stable, water stable, resistant to degradation, and free from microbial contamination, which is an advantage over the natural polymers such as chitin and chitosan.

15. A process of preparing copolymers of formula 1,

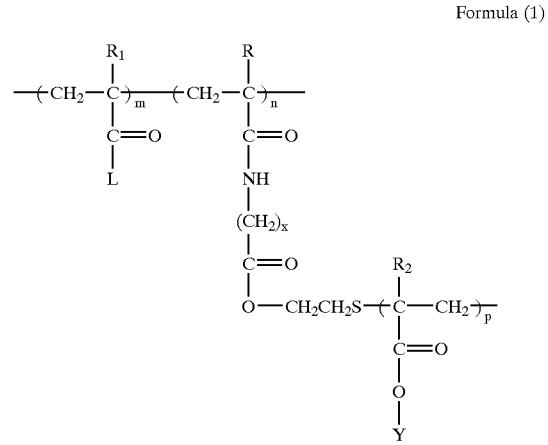

Formula (1)

wherein,

R is H, $CH_3$, $C_2H_5$, $C_6H_5$; $R_1$ is H, $CH_3$, $C_2H_5$, $C_6H_5$; $R_2$ is H, $CH_3$, $C_2H_5$, $C_6H_5$;

X is between 4–10; m is from 3 to 500; n is from 2 to 50; p is form 2 to 50; L is OH, $NH_2$, $OCH_3$, $NHCH(CH_3)_2$; and Y is N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose, said process comprising steps of:

(a) dissolving a polymerizable macromer in a solvent followed by stirring to obtain a clear reaction mixture, (b) purging nitrogen in the reaction mixture in the range of 10 minutes to about 45 minutes, (c) adding the reaction mixture of step (b) to an initiator containing an accelerator, (d) allowing the reaction mixture of step (c) to copolymerize for about 2 to 13 hrs at a temperature in the range of about 25° C. to 65° C., (e) precipitating the copolymer of step (d) by adding a solvent, and if desired, (f) drying the precipitated copolymer of step (e) by vacuum at room temperature to obtain the copolymer.

16. A process as claimed in claim 15, wherein the polymerizable monomer in the step (a) is selected from a group comprising of acrylic acid, methacrylic acid, methacryloyl chloride, acrylamide, N-isopropyl acrylamide (NIPA), 2-acrlamido-2-methylpropanesulphonic acid (AMPS) methacrylate, acryloyl chloride, acryloyl morpholine, vinylpyrrolidone or styrene.

17. A process as claimed in claim 15, wherein the solvent in the step (a) is selected from a group comprising of water, methanol, ethanol or isobutyl alcohol.

18. A process as claimed in claim 15, wherein the purging the nitrogen in the reaction mixture in the step (b) to about 30 minutes.

19. A process as claimed in claim 15, wherein the initiator in the step (c) is selected from a group comprising of Ammonium Per Sulphate (APS), Potassium Per Sulphate (KPS), or Azobis Iso Butyro Nitril (AIBN).

20. A process as claimed in claim 15, wherein the accelerator in the step (c) is N,N,N',N" Tetramethyl Ethylene Diamine (TEMED).

21. A process as claimed in claim 15, wherein the copolymerization in the step (d) is carried out at temperature in the range of about 30 to 60° C.

22. A process as claimed in claim 15, wherein the solvent in the step (e) is selected from group comprising of diethyl ether, acetone, hexane or hot water.

23. A process as claimed in claim 15, wherein the molecular weight of the copolymers is in the range of 1,000 to 2,00,000 daltons.

24. A process as claimed in claim 15, wherein the ratio of polymerizable monomer to polymeric macromer is in the range of 2:98 to 98:2.

25. A process as claimed in claim 15, wherein the copolymers containing the ligand are useful for applications in medicine and biotechnology.

26. A process as claimed in claim 15, wherein the copolymers are more stable for interactions with bio-molecules.

27. A process as claimed in claim 15, wherein the macropolymer polyvalent form are more efficient than NAG alone in enzyme inhibition.

28. A process as claimed in claim 15, wherein the binding constant ($K_b$) for copolymers of NIPA and Ac. NAG is in the range of $1.97 \times 10^5$ to $2.47 \times 10^5$.

29. A process as claimed in claim 28, wherein the copolymers along with NAG enhance the $K_b$ by 2556 folds than the NAG alone.

30. A process as claimed in claim 15, wherein the copolymers reduce the lysozyme inhibition ($I_{50}$) by about 28500 folds.

31. A process as claimed in claim 15, wherein the binding ($I_{max}$) of copolymers is enhance in the range of about 69 to 95.

32. A process as claimed in claim 15, wherein the copolymers containg the ligands are synthesized by free radical polymerization.

33. A process as claimed in claim 15, wherein the copolymers provide a greater accessibility to the ligand conjugate for binding with receptor bio-molecule.

34. A process as claimed in claim 15, wherein the copolymers containg ligands bind simultaneously on the multiple sites of the enzymes/disease causing viruses thereby enhancing the inhibitory effect.

35. A process as claimed in claim 15, wherein the copolymers ligands are stable, water stable, resistant to degradation, and free from microbial contamination, which is an advantage over the natural polymers such as chitin and chitosan.

* * * * *